United States Patent Office.

GEORGE H. MELLEN, OF ALEXANDRIA, VIRGINIA.

Letters Patent No. 61,849, dated February 5, 1867.

IMPROVED COMPOSITION FOR MAKING ELASTIC HAND-STAMPS.

*The Schedule referred to in these Letters Patent and making part of the same.*

TO ALL WHOM IT MAY CONCERN:

Be it known that I, GEORGE H. MELLEN, of Alexandria, Virginia, have invented, made, and applied to use a new and useful composition of matter for the purpose of making Elastic Hand-Stamps from which impressions in printer's ink and other inks may be taken.

The nature of my invention consists in combining glycerine, glue, sugar, or other saccharine matter, plumbago, pulverized soap-stone, and isinglass, to form a new and useful composition of matter for the above purpose.

To enable others, and those skilled in the arts, to make and use said composition, I will proceed to describe the same.

The ingredients I employ in its manufacture are: glue, either animal or vegetable, one pound; glycerine, one pound; sugar, or other saccharine matter, eight ounces; plumbago, four ounces; pulverized soap-stone, four ounces; isinglass, two ounces. I first soak the glue in cold water for about half an hour, till it becomes soft. I then boil it at a temperature of about 200° Fahrenheit. Then I place in all the other ingredients above described, and let them all boil together for about one hour, taking care to well stir the composition during the whole time it is boiling, so as to thoroughly mix and combine the ingredients. This is very essential, as when it is placed in the mould it will, when properly mixed, leave the letters formed in the matrix sharp and clear both on the edges and surface, and entirely clear from blow-holes that almost invariably occur in making composition stamps with only glue, glycerine, and sugar. The plumbago and soap-stone dust give a solidity to the composition and make it firm, at the same time preventing it from becoming hard and losing its elasticity. After the stamp is removed from the mould, and when it becomes perfectly cold and set, I apply a coating of varnish, made of shellac, to prevent the composition from being affected by dampness. My composition printing stamps can be used for printing on glass, porcelain, iron, wood, or paper, and, from its peculiar elasticity, can be used on circular or irregular surfaces.

I do not confine myself to the use of the above ingredients in the proportions named, as, to harden my composition, I use less glycerine and more plumbago, soap-stone, and isinglass; whereas, to make my composition softer and more elastic, I use more glycerine and less glue and the other mentioned ingredients.

What I claim, and desire to secure by Letters Patent, is—

The combining of the above ingredients to form, when boiled, a new and useful composition of matter for the purposes above described; and the coating of the same, when set and cold, with a varnish of shellac, to render the face of the composition impervious to dampness and the immediate effects of the weather, and so that the composition produces a clear and sharp edge and surface from the mould or matrix, without any blow-holes or other imperfections, substantially as described.

GEORGE H. MELLEN.

Witnesses:
W. N. WALTON,
JOHN S. HOLLINGSHEAD.